United States Patent [19]

Danneskiold-Samsoe et al.

[11] Patent Number: 5,247,338
[45] Date of Patent: Sep. 21, 1993

[54] PLANT FOR TRACK-BASED DETECTION OF THE WHEEL PROFILE OF TRAIN WHEELS

[75] Inventors: Ulrik Danneskiold-Samsoe, Soldalen; Johan Gramtorp, Hoje Skodsborgvej; Anders-Haure Torben Madsen, Alekaeret; Torben-Madsen Anders Haure, Ved Baekken, all of Denmark

[73] Assignee: Caltronis A/S, Kobenhavn, Denmark

[21] Appl. No.: 768,637

[22] PCT Filed: Apr. 11, 1990

[86] PCT No.: PCT/DK90/00097
§ 371 Date: Oct. 11, 1991
§ 102(e) Date: Oct. 11, 1991

[87] PCT Pub. No.: WO90/12720
PCT Pub. Date: Nov. 1, 1990

[30] Foreign Application Priority Data
Apr. 14, 1989 [DK] Denmark ............................ 1830/89

[51] Int. Cl.⁵ .................... G01C 3/00; G01B 11/24
[52] U.S. Cl. ..................................... 356/1; 356/376; 250/560
[58] Field of Search ..................... 356/1, 376; 250/560

[56] References Cited

U.S. PATENT DOCUMENTS

| | | |
|---|---|---|
| 4,155,526 | 5/1979 | Noble . |
| 4,325,640 | 4/1982 | Dreyfus et al. ............ 356/376 |
| 4,490,038 | 12/1984 | Theiser et al. ............. 356/1 X |
| 4,798,964 | 1/1989 | Schmalfuss et al. ........ 250/560 |
| 4,932,784 | 6/1990 | Danneskiold-Somsoe et al. ............... 356/376 |

FOREIGN PATENT DOCUMENTS

| | | |
|---|---|---|
| 0228500 | 3/1986 | European Pat. Off. . |
| 3526923 | 2/1987 | Fed. Rep. of Germany . |
| 3609863 | 2/1987 | Fed. Rep. of Germany . |
| PCT/DK87/-00122 | 10/1987 | PCT Int'l Appl. . |

Primary Examiner—Mark Hellner
Attorney, Agent, or Firm—Antonelli, Terry, Stout & Kraus

[57] ABSTRACT

An apparatus or system for a track-based detection of a wheel profile of passing train wheels, with the apparatus including an illumination unit with a light source and optical elements which transmit light towards a profile of the train wheels. An illumination area of the wheel profile is scanned with a scanning unit and a position of the wheel relative to the rail is scanned with a measuring unit. A data processing unit processes the data from the scanning unit relating to a condition of the wheel and a further unit is provided for transmitting the data concerning the condition of the wheels to at least a central processing unit.

10 Claims, 5 Drawing Sheets

PLANT FOR TRACK-BASED DETECTION OF THE WHEEL PROFILE OF TRAIN WHEELS

FIELD OF THE INVENTION

The invention relates to an apparatus for track-based detection of a wheel profile on a passing train and, more particularly, to an apparatus wherein when the train passes an optical unit of the apparatus comprising an illumination device and a scanning unit for scanning reflective light, the profile of the train wheel is determined.

BACKGROUND OF THE INVENTION

Wear on the flanges and treads of railway wheel is a well-known phenomenon, with the wear giving rise to increased operating costs and reduced safety if the presence of the defect is not quickly established so that the carriage in question can be taken out of service and be repaired at a time expedient for railway operations.

Usually, the presence of wear on railway wheels is ascertained by manual inspection of the treads and flanges of the wheels. This is a difficult procedure to control, and there are also purely practical difficulties in mechanically measuring and checking the wheel profile.

Today, the maintenance of the wheels is almost never effected on the basis of a conditional supervision but on the basis of statistical empirical data, with the result being that some wheels with defects are not discovered and immediately repaired, while, on the other hand, many failure-free wheels are subjected to unnecessary inspection. However, it is known that the wear on treads and flanges can occur far more quickly than expected, for example, because of insufficient rail lubrication or following track repair work. Wheels with worn treads or flanges must, however, be repaired as quickly as possible after the defect has been ascertained, in that these wheel defects can result in greatly increased wear and further possible damage. Moreover, worn wheels increase the possibility of derailment, particularly when running in curves and through switch points.

In for example, PCT/DK87/00122, an apparatus for the scanning of the wheel profile on passing train wheels is proposed which is based on the wheel intersecting a skewed beam of light or pencil of rays during the simultaneous measurement of the distance to the reflection point(s) on the running surface. In practice, this apparatus functions as desired, but requires a measurement of the speed of the wheel in order to provide precise information concerning the wheel profile.

European patent application no. 0,228,500 proposes an apparatus for contact-less measurement of the wherein the wheel profile is illuminated from underneath with a light edge. The scanning of the wheel profile is effected tangentially to the wheel with one or more cameras, the signals from which are processed electronically. This apparatus can only function with the use of a narrow auxiliary rail, so that almost all of the wheel profile can be illuminated from underneath, and, consequently, the apparatus can only be used during very slow running of the train wheel and with unloaded carriages or in workshops where the wheels are lifted free of the rail element.

In German publication no. 3,526,923, an apparatus for the measuring of wheel profiles is proposed wherein a skewed laser beam is intersected by a wheel as it passes, and, at the same time, a camera photographs the illuminated area. The resulting photographs of the wheel profile are compared with pictures of correct wheels taken at the same angle. As apparent such an apparatus can provide only a very rough picture of the extent of the wear on a wheel, and it can be assumed that the apparatus can only be used to find very severe damages on the wheels.

SUMMARY OF THE INVENTION

The aim underlying the present invention resides in providing an apparatus for the track-based detection of the wheel profile on train wheels which functions in a fully automatic manner while running at normal operational speeds. The apparatus as capable of functioning without knowledge of the speed of the wheel, and is capable of detecting the wheel profile on heavily loaded carriages during completely normal operating conditions.

In accordance with advantageous features of the present invention, an apparatus for a track-based detection of a wheel profile of train wheels is provided with the apparatus including an optical unit having an illumination device comprising a light source arranged for transmitting structured light towards a profile surface of the wheel, with the illumination device being triggered by an actual position of the wheel. A scanning unit is provided which includes means for scanning reflected light from the profile surface of the wheel with a means also being provided for transferring the scanned signals to a data processing unit. A further unit measures or calculates the actual position of the wheel in a transverse direction, and means are provided for transferring data from the further unit to the data processing unit. The data processing unit at least processes, converts and corrects and, possibly, stores measured and calculated data and also supplies or is supplied with information concerning an optical axes of the illumination unit and the scanning unit. By virtue of the above-noted features of the present invention, the apparatus, as a unit, may be placed at the rail element and can measure the wheel profile of all wheels on the train when it passes the detection apparatus. Each time the illumination unit is triggered by a passing wheel, structured light is transmitted towards the wheel, e.g. from a flash light arrangement with suitable optical elements, so that a desired pattern, e.g. a line or grid pattern, is projected in on the profile surface of the wheel at an inclined angle from the apparatus, and the picture formed at the profile surface is scanned with a scanning unit, e.g. a CCD camera or the like, at a certain angle. By optical picture formation and consequent picture treatment by suitable programs in the data processing unit, the profile of the wheel is calculated at the place of measurement. Alternatively, coefficients and other characteristic values of the wheel profile can be calculated. With flashlight, the wheel profile can be scanned in this manner without having to know the train's speed of the train or wheel, but only the transverse or side position on the rail, a position which can be measured or calculated.

If the relevant stretch of track is used to carry carriages with wheels of different sizes, the apparatus according to the invention means may be provided for determining or measuring the size of the wheel with a means for transferring data corresponding to the determined or measured size to the data processing unit. The information concerning the wheel size can be used to trigger the illumination unit, or for the correction of the measurement signals during the data processing.

In accordance with further features of the present invention, the apparatus may include at least one wheel detector placed on or at the rail on which the wheel rolls. The wheel detector can be based, for example, on magnetic induction, and can be used both for controlling the triggering of the illumination device and for the ascertaining of the wheel size.

According to the present invention, a further light source may be arranged to illuminate one of the sides of the wheels, with a further scanning unit being arranged so as to scan at least a part of an edge area of the illuminated side of the wheel. The additional scanning unit may be coupled to a calculation circuit which is arranged to transfer data to the data processing unit the size of the wheel simultaneously with the scanning of the wheel profile, so that the profile measurement can be corrected following the size of the wheel. This part of the apparatus will normally also be placed at the side of the rail element, but can possibly also be placed between the rails and measure on the inner side of the wheel. If this part of the apparatus is placed on a foundation independently of the rail element, one can also measure the downwards deflections of the rail during the passing of the train in manner described more fully below.

In accordance with the present invention, the light source may be arranged so as to shed a rectilinear pencil of rays on the profile surface of the train wheel so that a line of light extends transversely across the surface of the wheel with the line or pencil of light being scanned and the subsequent picture processing, and with knowledge of the angles between the light source, the scanning unit and the rail element, and with knowledge of the wheel size, data processing can hereafter be carried out so that the cross-sectional profile of the wheel or characteristic values of this profile can be obtained. By comparison with, for example, stored data for a perfect wheel, the apparatus can immediately determine whether the wheel profile is worn too much, or whether the profile still lies within acceptable tolerances.

Advantageously, the light source may be arranged to shed a number of parallel rectilinear lines of light on the profile surface and be adapted to be focused at different distances from the light source. A fixed starting point can be used for triggering the illumination unit and measurement of the wheel profile on wheels of different sizes. Therefore, this embodiment is advantageous for use at stretches of the track which serve to carry carriages with wheels of different sizes.

According to the invention, the optical axes of the scanning unit may be skewed with respect to an axis of the wheel and may be directed at an inclined angle upwardly toward the illuminated area on the profile surface, with a means being provided for correction of the downward deflection of the rail elements in the vertical direction as a consequence of the weight of the train. Moreover, a position measuring unit may be arranged so as to be placed immediately at the side of the rail element, with the measuring unit including a means for further transmission of measurement data. By virtue of these features, the apparatus can be placed at a suitable distance at the side of the rail element and be coupled to a wheel detector which indicates that a wheel is now in the correct position for measurement of the profile. If the apparatus is not arranged in such a manner that it follows the downward deflection of the rail under the weight of the train, correction can be made for this by measuring the deflection. The resulting measured and calculated data forms the basis for an automatic or manual qualitative evaluation of how quickly the relevant wheel or the relevant carriage shall be taken out of service for repair. The entire measurement and the entire course of calculation usually takes place at measuring section. The data which are transmitted further from the apparatus generally consists solely of data which are representative of the condition of the wheel with regard to wear. Naturally, the plant can also be arranged so that only data concerning wheels which are worn over and above a certain extent is transmitted further. This is of great practical value since there is frequently only access to a normal telephone line with consequently poor transmission capacity.

In accordance with the present invention, a means may be provided for detecting when a train enters the measuring area and also to detect when the last carriage leaves the area. Moreover, the wheel detector can be used to detect the size of the wheel, so that the plant is provided with information concerning the wheel size before or at the same time as the measuring sequence is initiated.

In accordance with still further features of the present invention, a wireless carriage identification system may be coupled to the data processing unit and arranged in such a manner that measured or calculated data for a wheel can be assigned to the carriage identification, whereby the control of the amount of data is considerably simplified, and information concerning the condition of the wheel can be stored together with the carriage number, and possibly information concerning which wheel on the carriage is involved. Furthermore, the carriage identification system can be used to provide the apparatus with data concerning the size of the wheels, e.g. by having the apparatus comprise a database containing associated information concerning carriage numbers and wheel sizes.

BRIEF DESCRIPTION OF THE DRAWINGS

The invention will now be described in closer detail with reference to a preferred embodiment and with reference to the drawing, wherein.

DETAILED DESCRIPTION

Figure 1:
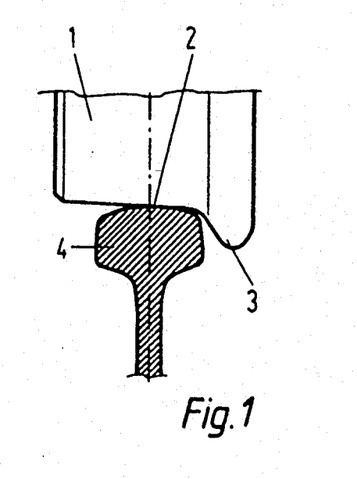
FIG. 1 shows the wheel profile of a perfect wheel.

Referring now to the drawings, wherein like reference numerals are used throughout the various views to designate like parts and, more particularly, to FIG. 1, according to this figure, a flanged wheel 1, in the form of a wheel rolling on a rail 4, has a tread 2 and a flange 3 with a cross-sectional profile corresponding to the for a perfect train wheel, with the tread 2 and the flange 3 forming the profile surface of the wheel.

Figure 2:
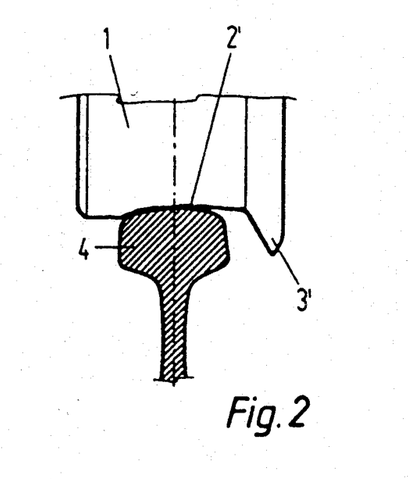
FIG. 2 shows the wheel profile of a worn wheel.

After having run for some time, the profile surface becomes worn resulting in for example a tread 2' and the flange profile 3', as shown in FIG. 2.

Figure 3:
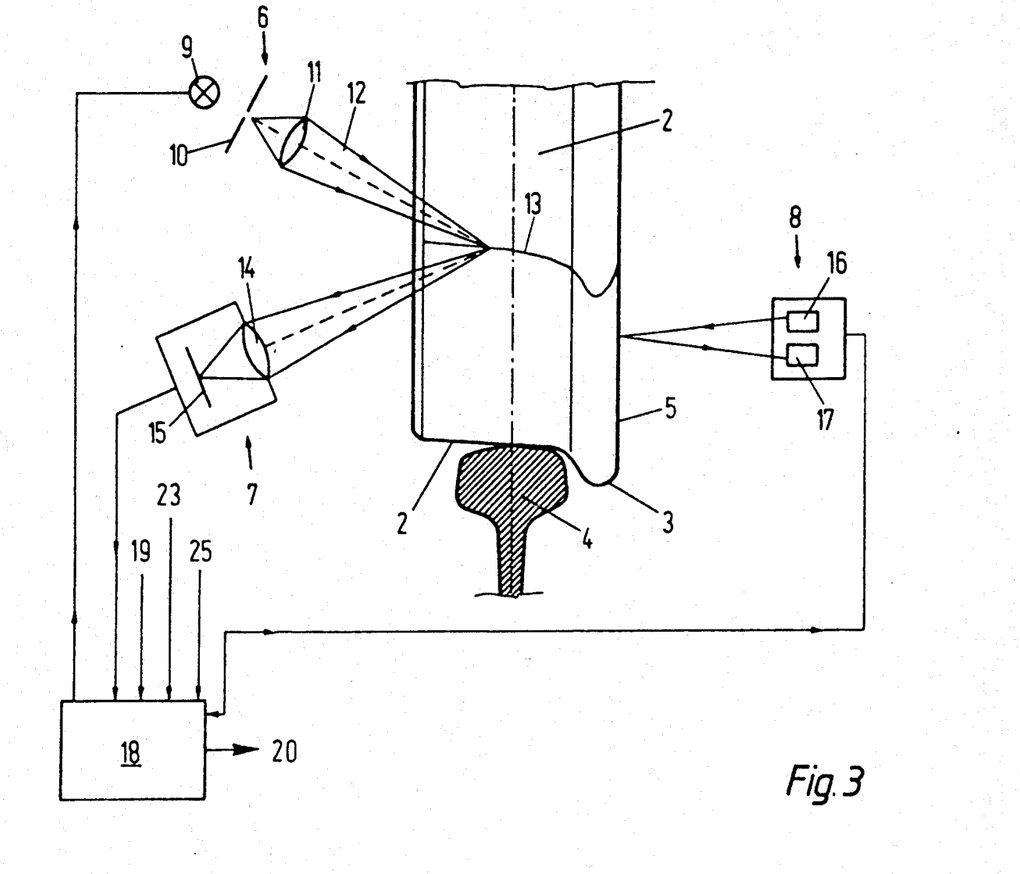
FIG. 3 shows the detection apparatus according to the invention.

As shown in FIG. 3 the apparatus according to the invention includes a light source 9, for example, a flashing lamp in an illumination device 6, is arranged to transmit light 12 towards the profile surface 2,3 on the train wheel. In this case the light is a straight pencil of light formed by a shutter 10 and a lens 11, e.g. a cylindrical lens. Since the light is directed towards the surface at a certain angle, because the illumination device 6 has to be placed at the side of the rail element so that the railway carriage can pass the apparatus, and because the light is not directed on the wheel radially, an illuminated area 13 is obtained in the form of a curve, the shape of which depends both on the direction of the optical axis of the illumination device 6 and on the shape of the profile surface, i.e. depending on the extent to which the wheel profile is worn. The illuminated area 13 is scanned with an optical scanning unit 7 which, for example, can be a CCD camera with an optical system 14 and a photocell matrix 15. The curve 13 is depicted on the photocell matrix 15 at a certain angle, depending on the direction of the optical axis of the scanning unit 7.

The apparatus further includes a measuring unit 8 which measures the position of the wheel with respect to the rail 4, e.g. by distance measurement with a transmitter and a receiver 17, e.g. using a laser beam directed toward an inner side 5 of the wheel. The inner side 5 of the train wheel is normally used as reference for the profile surface.

All parts of the connected to a data processing unit 18 via suitable interface equipment (not shown). To the data processing unit 18, or possibly directly to the illumination device 6, there is fed a trigger signal 19 which triggers the light source in the illumination device 6, so that light in the form of a flash is directed on the profile surface when the wheel is in correct position. The trigger signal is discussed in more detail later in connection with FIGS. 8-10.

The data processing unit 18 may also be supplied with information 23 concerning the size of the wheel This information can be generated, for example, from the signal from a wheel detector based on magnetic induction, or as information 25 from a commonly-known wireless carriage identification system or in another known manner.

From the data processing unit 18, data can be transmitted, e.g. via a telephone line 20, to a central computer or to other surveillance equipment or signal installation.

Figure 4:
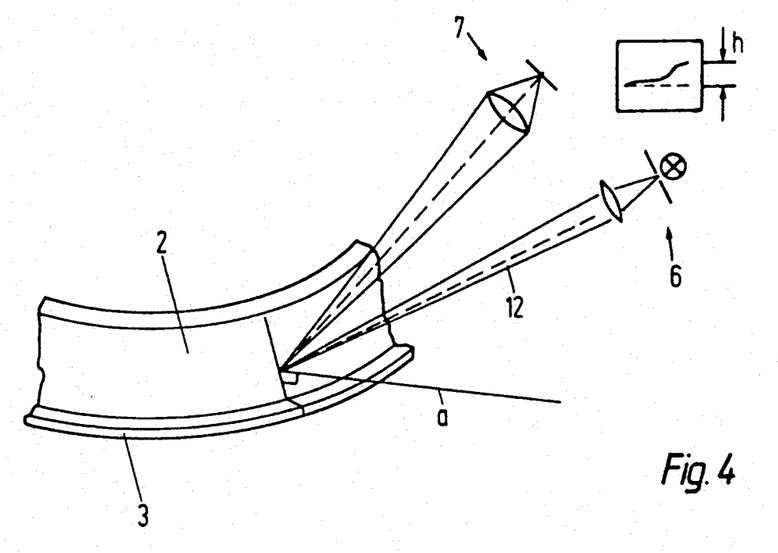
FIG. 4 is a sketch showing the measuring principle according to the invention.

The measuring principle can, for example, be a form of triangulation on the basis of the picture which the light of the profile surface, with knowledge of the axes of the optical units and their directions. In FIG. 4 is seen the measuring principle with the use of optical picture formation and subsequent picture processing. The illumination device 6 directs light on the wheel profile, and depending on the angle of the illumination element and the angle of the scanning unit 7 to the surface norm a, a picture is obtained having a shape which depends on the height h of the object.

Figure 5:
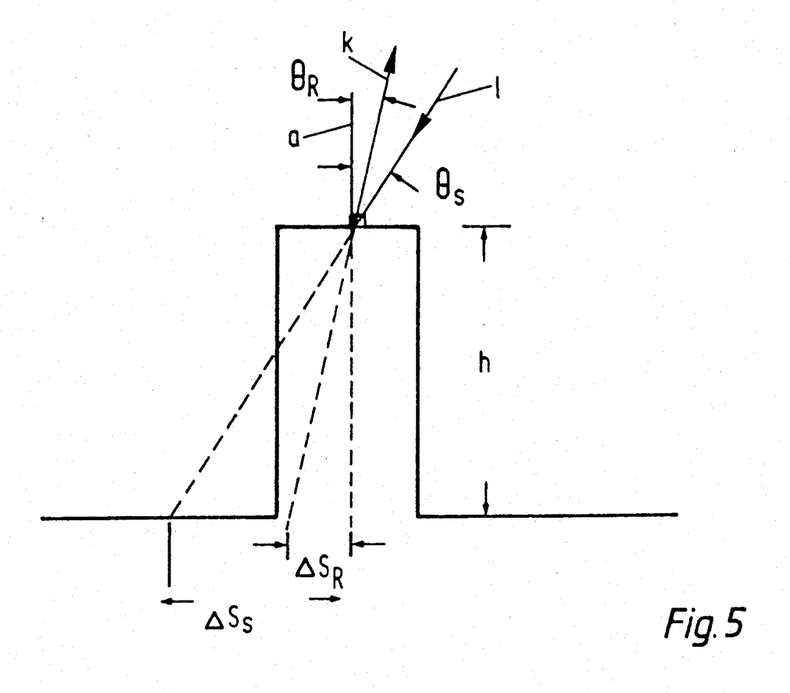
FIG. 5 is a sketch for explaining the measuring principle according to the invention.

A measure of the line displacement seen along the optical axis k of the scanning unit 7 can now be found in accordance with the relationships in FIG. 5 wherein;

k represents an optical axis of the scanning unit 7
l represents an optical axis of the rectilinear light from the illumination device 6
h represents the object height
$\theta_S$ represents the angle between the direction from "the running direction" a and the direction l to the illumination device
$\theta_R$ represents the angle between the direction from "the running direction" a and the direction k to the scanning unit
$S_S$ represents the physical line displacement due to the object height h
$S_R$ represents line displacement due to the angle from $\theta_R$ to a One can now find the physical line displacement when taking into consideration a non-normal direction of vision in accordance with the following equation represents a $$\Delta S_S - \Delta S_R = \tan\theta_S \times h - \tan\theta_R \times h$$

The line displacement observed by the scanning unit is determined by projecting the physical line displacement in on the line of sight k of the scanning unit in accordance with the following equation:

$$\begin{aligned}\Delta S &= (\Delta S_S - \Delta S_R) \times \cos\theta_R \\ &= (\tan\theta_S - \tan\theta_R) \times \cos\theta_R \times h\end{aligned} \quad (1)$$

By virtue of the relationship expressed in equation (1), it is possible to calculate the requirements for the resolution, sensitivity and the relevant angles of the overall system.

With commercially available scanning units 7, there are no problems in achieving a scanning precision of considerably less than 0.5 mm. If, for example, a dot resolution of 1 mm is required and that train wheel has a profile breadth of approximately 135 mm, the problem presented can be solved comfortably with a CCD camera of 500=582 picture dots.

As apparent from equation (1) the angles $\theta_S$ and $\theta_R$ are different in order to obtain a line displacement at the profile height h. For practical reasons, for example because of the brake block around the wheels and also to enable measuring of small train wheels down to diameters of 350 mm, the structured rectilinear light must be projected in on the wheel near to the rail element 4, for example, at about 100 mm the rails.

Figure 6:
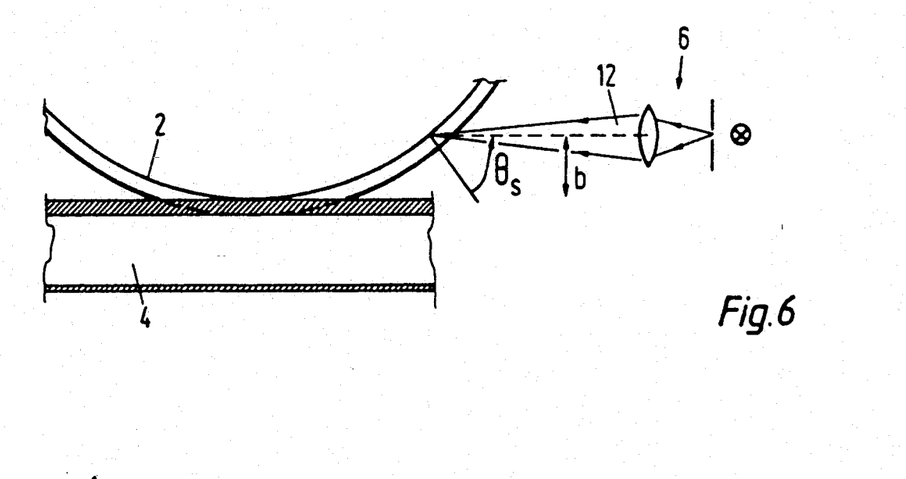
FIGS. 6, 7a, 7b and 8 show different sketches for explaining the measuring principle according to the invention.

If the line projection is parallel to the train (FIG. 6), the angle $\theta_S$ from the surface norm a to the illumination direction can be calculated. For small wheels with a radius of 175 mm, an angle $\theta_S$ of 25° .4 is obtained, and an angle $\theta_S$ of 58° .2 is obtained for large wheel radii of 667 mm.

Figure 7A:
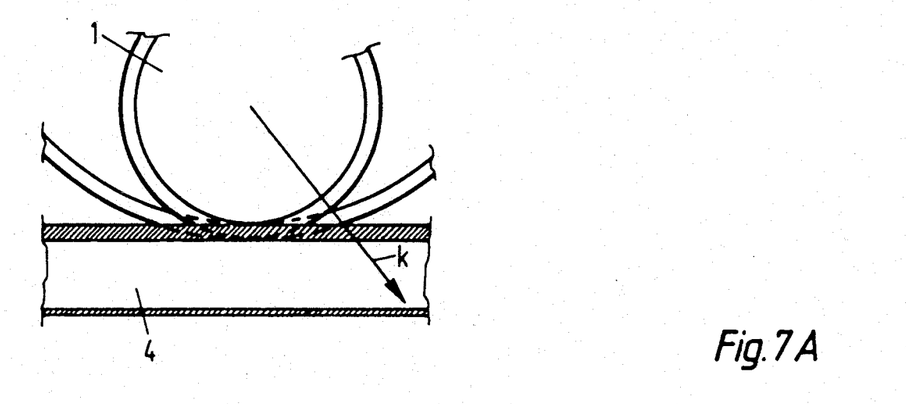
Figure 7B:
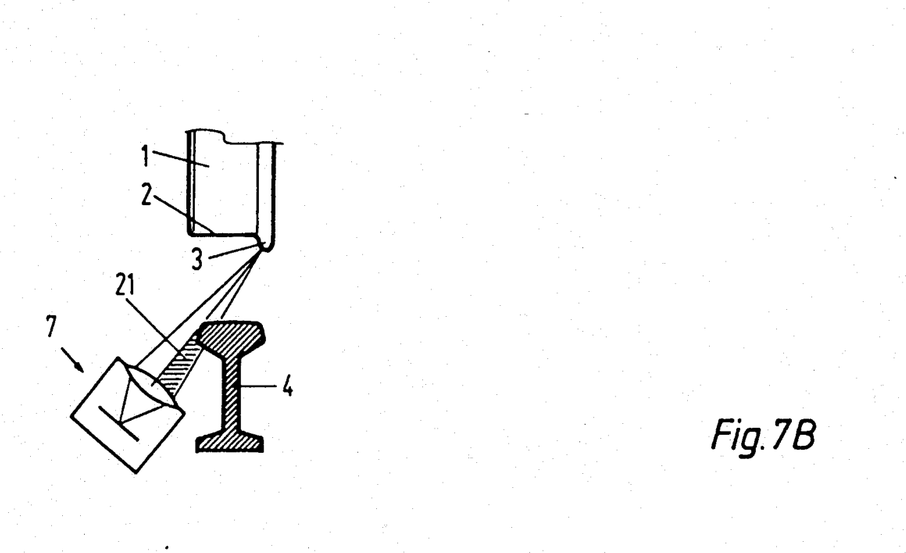

To achieve good utilization of the light from the illumination device, the angle $\theta_R$ (FIG. 5) must be as small as possible. With large wheel diameters, it is difficult to obtain a small angle $\theta_R$, the reason being that the rail shadows the field of vision of the scanning unit as apparent from FIGS. 7A and 7B. The shadowing 21 (FIG. 7B) can be avoided by placing the scanning unit sufficiently far away from the center of the rail 4. When employing equation (1), the result obtained for the two wheel sizes mentioned above is:

$\Delta_S = 0.475 \times h$ (radius 175 mm)

$\Delta_S = 0.814 \times h$ (radius 667 mm)

which means that, without a considerable reduction in the CCD camera, surveillance can be carried out on wheels of all sizes.

Figure 8:
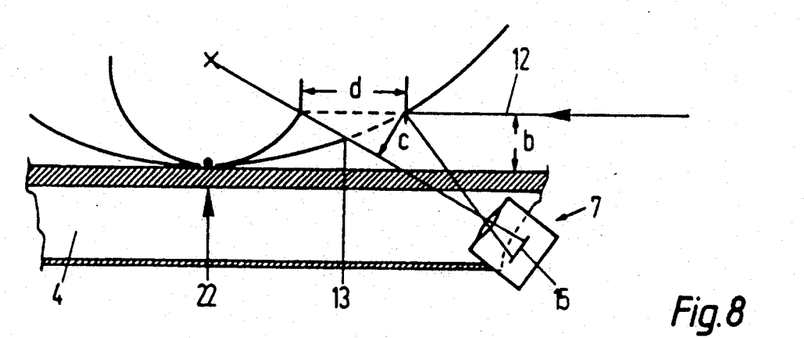

The different wheel radii result in a line displacement on the photosensitive dot matrix in the CCD camera. More particularly, as shown in FIG. 8. The pencil of light is directed at the height b of for example 100 mm above the rail 4. This results in a change d of up to 193 mm for the position of the wheel profile surface from a small diameter wheel to a large diameter wheel, i.e., for example, if one presupposes a fixed position of the trigger device 22 for the triggering of the illumination device, independently of the wheel diameter size. In the direction at right-angles to the optical axis of the CCD camera 7, there occurs a displacement c of up to 83 mm for the position of the illuminated area (the line) 13 on the profile surface, and therefore the dot matrix 15 of the CCD camera 7 must be of sufficient extent for the line 13 always to be depicted on the active matrix surface, regardless of the degree of reduction which takes place in the lens system of the camera.

Figure 9:
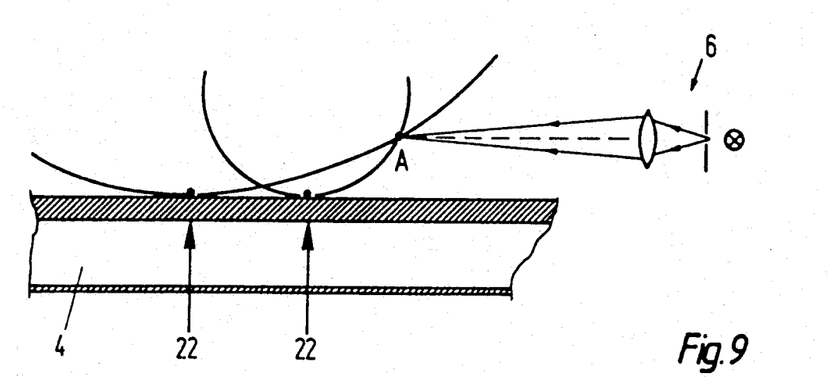
FIG. 9 shows a first embodiment for the measuring principle according to the invention.

A second solution possibility is shown in FIG. 9. One is able to ensure that the distance the depiction point A on the wheel profile to the illumination device 6 and also to the scanning unit is always independent of the wheel size by changing the position of the point 22 for that place/time at which the triggering of the illumination device 6 is effected. The time at which a given wheel's wheel is at point A can be ascertained, for example by means of a laser distance measuring unit, for example, of the Selcom type from Selcom AB, Sweden, and as discussed in the international patent application PCT/DK87/00122.

Figure 10:
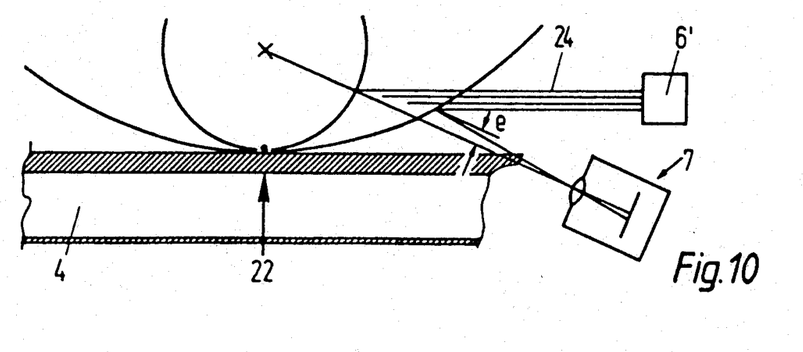
FIG. 10 shows a second embodiment for the measuring principle according to the invention.

A third solution is shown in FIG. 10. A pencil of a plurality of rays 24 which, for example, can be a pattern of lines focussed at different distances from the illumination unit 6', namely distances which correspond to the different sizes of wheel diameters, are directed on the profile surface. If the light rays 24 distributed, for example, over 30 mm in the vertical direction, the possibility is provided of the camera being able to observe an area e which lies within 0–41 mm, so that picture formation takes place of all columns within the CCD camera's matrix array, whereby surveillance can be carried out on all wheel sizes while using one fixed triggering point 22.

With all of the above-described embodiments of the invention, the flash-time for the illumination device 6,6' is such that the wheel does not move too much during the flash period, for example such that the wheel does not move more than 0.2 mm, which means that the flash must take place within a period of around two microseconds. In practice, this does not give rise to technical problems. Both measurements and calculations have shown that no technical problems present themselves in obtaining sufficient light energy in the illuminated area for use to be made of, for example, a CCD camera of the Fairchild CCD 4001 type. With a suitably high light intensity, it is possible to use the apparatus according to the invention in broad daylight.

Figure 11:
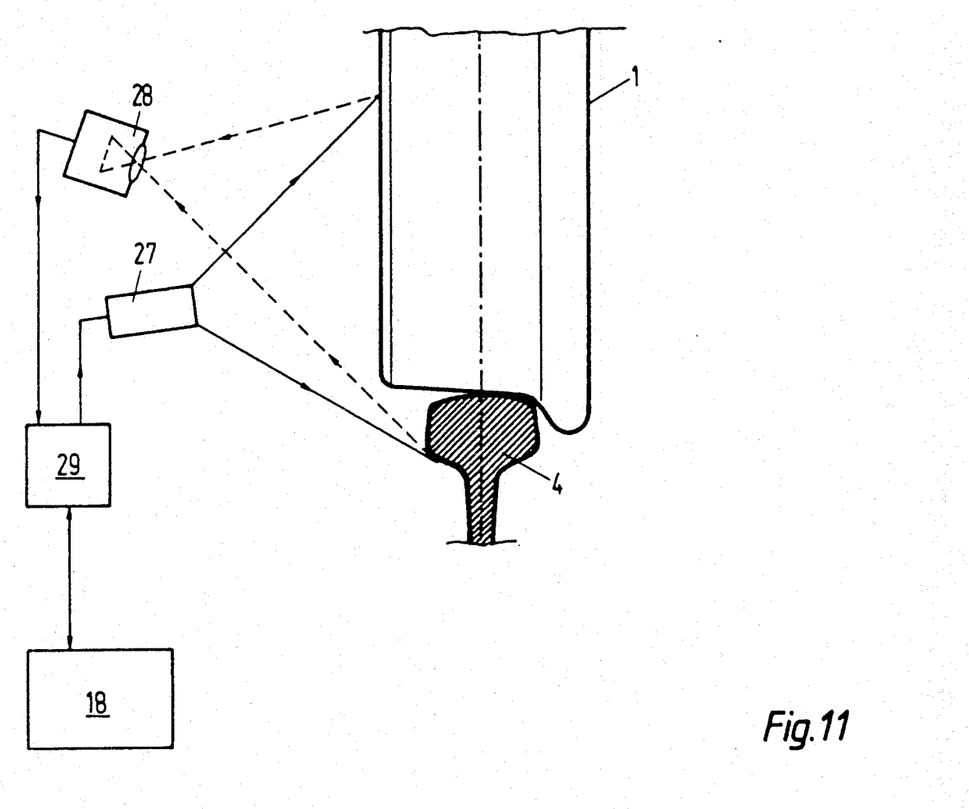
FIG. 11 shows a part of the plant for measuring the wheel size and possible measurement of the downwards deflection of the rail.

FIG. 11 provides an example of the manner by which during the passing of the train a direct measurement of the size of the wheel and the downward deflection of the rail under the weight of the train can be carried out. A light source 27, illuminates the outer side of the wheel (or possibly an inner side) triggered by the data processing unit which controls the entire apparatus. The illuminated area, or at least a part hereof, which includes the edge of the wheel, is scanned by a camera 28, e.g. a CCD camera. An electronic picture processing unit 29 then calculates the size of the wheel, for example a diameter, of the wheel and transmits this information to the data processing unit 18. If the camera is supported in a fixed manner, for example, on an independent foundation, the apparatus can also calculate or scan the downward deflection of the rail 4. Both of these measurements are carried out substantially simultaneously with the scanning of the wheel profile as explained above.

Furthermore, the apparatus can be arranged in such a manner that the camera 28 can detect the light 12, 24 which is focussed on the profile surface, so that the scanning point A on FIG. 9 is detected.

If the apparatus of FIG. 3 is extended with the arrangement shown in FIG. 11, the resulting apparatus can be placed directly at the rail element and undertake complete and precise wheel profile measurements of passing wheels.

We claim:

1. An apparatus for a track-based detection of the wheel profile of train wheels, the apparatus comprising:
    an optical unit including an illumination device having a light source arranged for transmitting light towards a profile surface of the wheel, said illumination device being triggered by an actual position;
    a scanning unit including means for scanning of light reflected from the profile surface of the wheel and means for transferring scanned signals to a data processing unit;
    a further unit for at least one measuring or calculating an actual position of the wheel on the rail with respect to a transverse direction of a rail upon which the wheel is running; and
    means for transferring data from said further unit to the data processing unit, and
    wherein the data processing unit at least processes, converts and corrects the measured or calculated data and one of supplies or is supplied with information concerning an optical axes of the illumination and the scanning unit.

2. An apparatus according to claim 1, further comprising means for determining a size of the wheel, and means for transferring data from the determining means to the data processing unit.

3. An apparatus according to one of claim 1 or 2, further comprising at least one wheel detector disposed either on or at the rail.

4. An apparatus according to claim 2, wherein the means for determining comprises a further illumination unit including a further light source for illuminating one side of the wheel, and a further scanning unit arranged so as to scan at least a part of an edge area of an illuminated side of the wheel, and wherein the scanning unit is coupled to a calculation circuit adapted to transfer data to the data processing unit.

5. An apparatus according to claim 1, wherein the light source is arranged so as to direct a rectilinear pattern of light rays on the profile surface so that a line of light extends transversely across the profile surface.

6. An apparatus according to claim 1, wherein the light source is arranged so as to direct a plurality of parallel rectilinear lines of light on the profile surface of the wheel, and wherein the lines of light are focussed at different distances from the light source.

7. An apparatus according to one of claims 5 or 6, wherein an optical axis of the scanning unit is skewed with respect to an axis of the train wheel and is directed at an inclined angle upwardly toward an illuminated area on the profile surface, and wherein means are provided for correcting data relating to the surface profile of the wheel due to a downward deflection of the rail in a vertical direction resulting from a weight of the train.

8. An apparatus according to claim 1, wherein said further unit is arranged immediately adjacent a side of the rail, and wherein said further unit comprises means for enabling a further transmission of data from said further unit to at least one of a central processing unit, surveillance equipment or a signal installation.

9. An apparatus according to one of claims 1 or 2, further comprising means for detecting when a train enters a profile detection area and for detecting when a last carriage of the train leaves the profile detection area.

10. An apparatus according to one of claim 1 or 2, further comprising a wireless carriage identification system coupled to the data processing unit and being adapted to assign carriage identification in dependence upon the measured or calculated data.

* * * * *

UNITED STATES PATENT AND TRADEMARK OFFICE
CERTIFICATE OF CORRECTION

PATENT NO.     : 5,247,338
DATED          : September 21, 1993
INVENTOR(S)    : U. Danneskiold-Samsoe et al.

It is certified that error appears in the above-identified patent and that said Letters Patent is hereby corrected as shown below:

<u>Title page,</u>
Item [73], should read:
-- [73] Assignee: Caltronic A/S, Kobenhavn, Denmark --.

Signed and Sealed this

Fifteenth Day of November, 2005

JON W. DUDAS
*Director of the United States Patent and Trademark Office*